Dec. 6, 1927.

L. BLACKMORE 1,651,367

TRACTOR

Filed Jan. 5, 1923    2 Sheets-Sheet 1

Inventor

Lloyd Blackmore

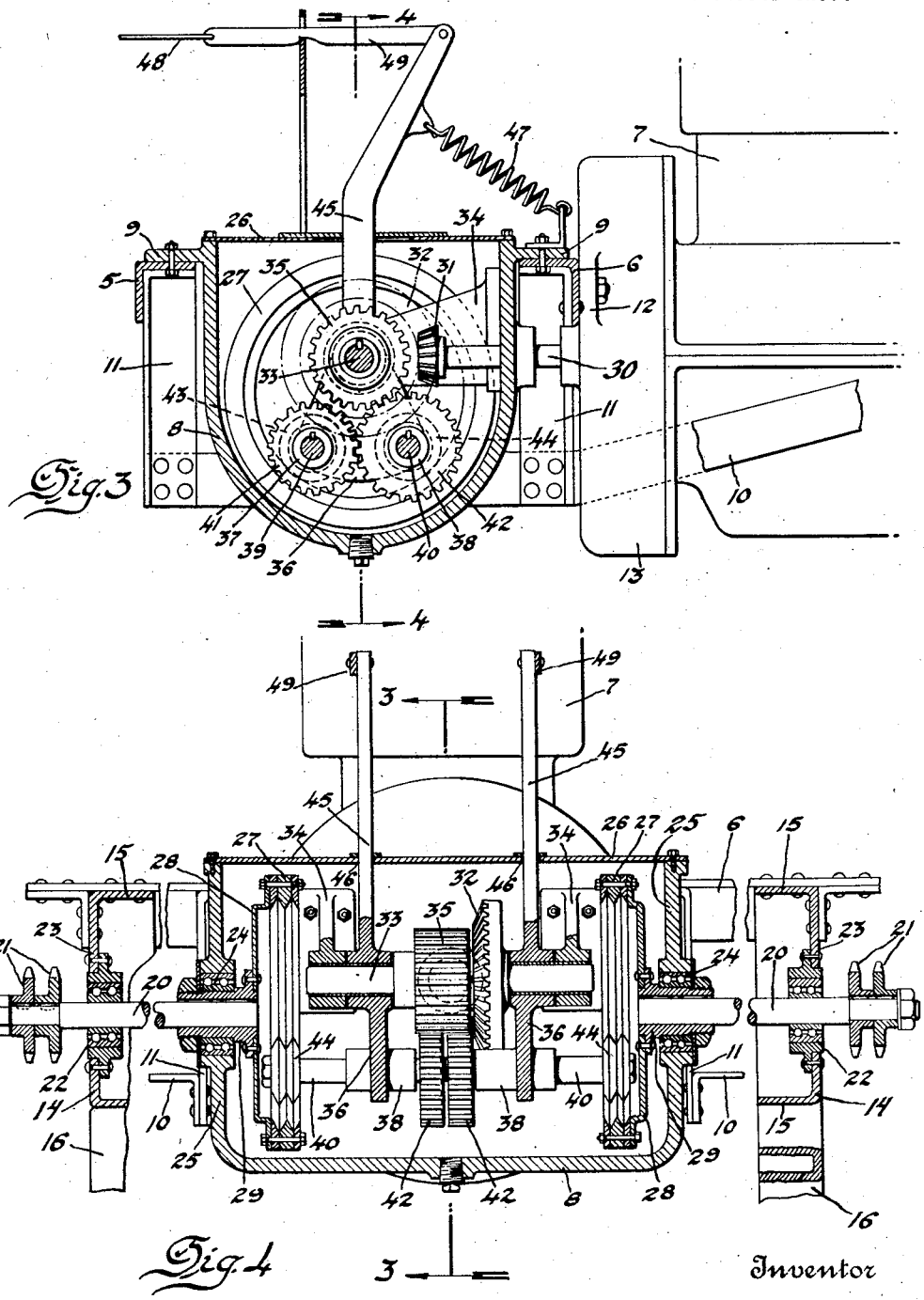

Patented Dec. 6, 1927.

1,651,367

UNITED STATES PATENT OFFICE.

LLOYD BLACKMORE, OF HIGHLAND PARK, MICHIGAN, ASSIGNOR TO GENERAL MOTORS CORPORATION, OF DETROIT, MICHIGAN, A CORPORATION OF DELAWARE.

TRACTOR.

Application filed January 5, 1923. Serial No. 610,802.

My invention relates to tractors designed for hauling agricultural implements and for general farm purposes, and the principal object thereof is to provide an improved tractor which will be simple in construction and not likely to get out of order, which may be manufactured at a minimum of expense, and which will be convenient and effective for the purpose for which it is designed; my invention being particularly directed to tractors of the general type or class wherein four wheels are employed, two located upon each side of the machine, and all of which wheels are driven from the engine whereby the tractor is propelled.

My invention relates for the most part to the transmission mechanism through which power is communicated from the engine of the tractor to the four driving wheels thereof; and a further object of my invention is to provide improved driving mechanism of the friction type through which the two driving wheels on each side of the tractor may be driven independently of those on the other side, and either in a forward or in a reverse direction; to thereby provide for the operation of the tractor both forward and backward, the steering thereof, and the turning of the same about within a minimum space.

A further object of my invention is to provide improved frame construction in tractors of the type above referred to, that is, of the type wherein all the wheels which support the machine are driving wheels; the construction of the frame being such that increased flexibility thereof is secured upon the one hand, and greater strength upon the other.

A further object of my invention is to provide an improved tractor of the type above referred to and wherein the construction of the frame, the arrangement of the wheels, and the disposition of the engine and transmission mechanism relative to the frame and to the wheels is such that the downward force upon the several driving wheels is more uniform than has heretofore commonly been the case, and is in fact substantially equally distributed between the four driving wheels when the tractor is in use hauling an agricultural implement or other device.

With the above and other objects of invention in view my invention consists in the improved tractor and subordinate parts and auxiliary features thereof illustrated in the accompanying drawings and hereinafter described and explained; and in such variations and modifications thereof within the scope of the concluding claims, as will be obvious to those skilled in the art to which my invention relates.

In the drawings accompanying and forming a part of this specification, and wherein the preferred embodiment of my invention is illustrated, and wherein the same reference numerals are employed to designate like parts in the several views, Figure 1 is a view showing my improved tractor in side elevation.

Figure 3 is a fragmentary view showing a section upon a vertical longitudinally extending plane, indicated approximately by the lines 3—3, Figure 4.

Figure 4 is a view showing a section upon a transverse plane indicated approximately by the lines 4—4, Figure 3.

Figure 1:
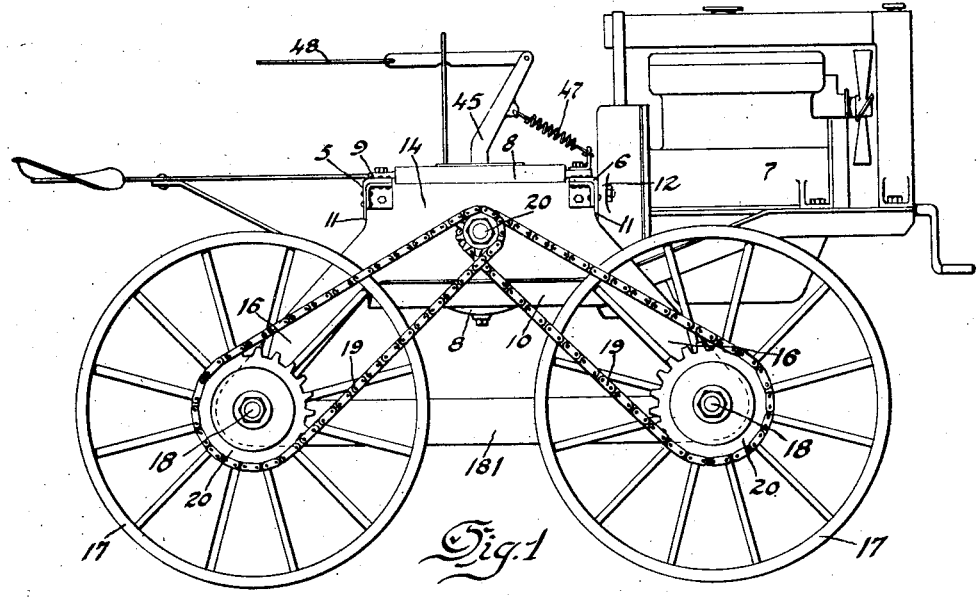
Figure 2:
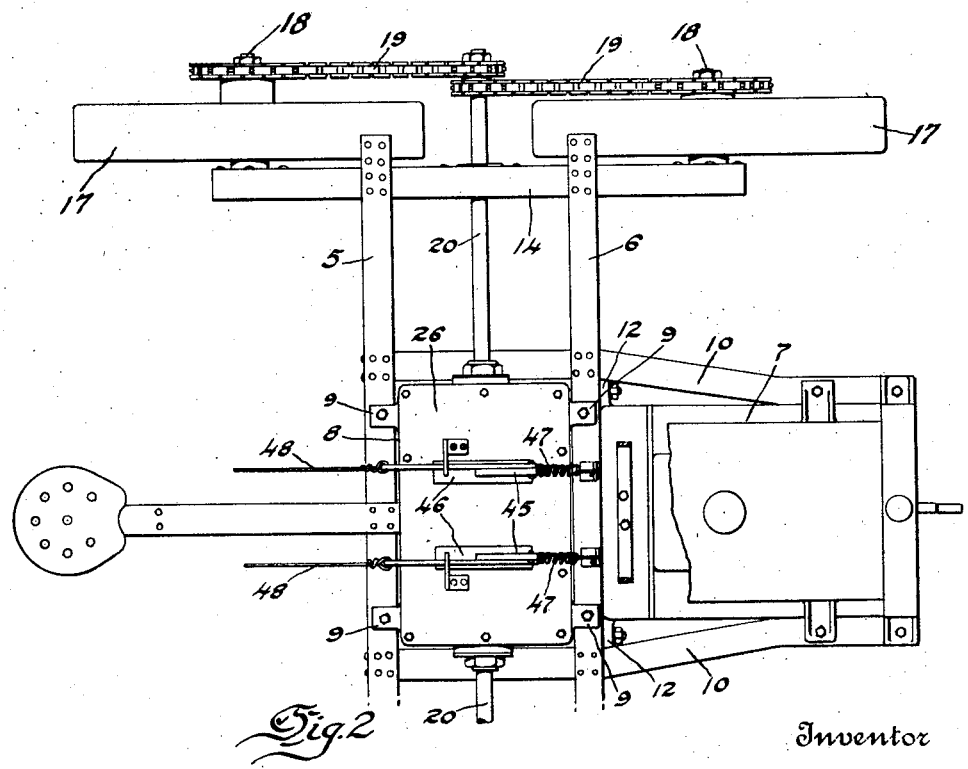
Figure 2 is a fragmentary view showing my improved tractor in plan, the wheels upon one side being omitted to shorten the view.

Referring now to the drawings, the reference numerals 5, 6 designate two transversely extending main frame members spaced apart from one another, but arranged comparatively close together as compared with the distance between the axes of the front and rear wheels of the tractor; which frame members may be of various forms but which are shown as comprising suitable lengths of angle iron to thereby provide a frame structure which will be comparatively light in weight, but which at the same time will be flexible to such a degree that it may yield slightly when the tractor is in use and passing over uneven ground and sufficiently stiff to avoid buckling of the frame; the flexibility of the frame structure being due in part to the form of the frame members and in part to the fact that they are arranged comparatively close together, as will be appreciated.

The frame members 5, 6 support the engine 7, which may be of any suitable form, as well also as the transmission mechanism or gearing of the tractor; the latter being enclosed within a suitable gear casing 8 located adjacent the central portion of the vehicle and supported from the frame members in any suitable way as by means of lugs 9 resting upon the frame members. The engine is shown as supported from the frame members through and by means of a sub-frame structure comprising angle iron bars 10 extending transverse to the frame bars and supported beneath the same by depending posts 11; said bars 10 being bent upward at their forward end, as shown in Figure 1, and so arranged as to support the engine at the proper level relative to the main frame and to the transmission mechanism of the tractor. The rear end of the engine is secured to the front frame bar 6 through lugs 12 which are shown as formed upon the fly wheel enclosing casing 13 of the engine structure.

The reference numerals 14 designate two end frames identical in form with one another and disposed one upon each side of the tractor, and which are shown as formed from a suitable plate metal blank bent to provide inwardly extending flanges 15 at the top and bottom of the upper horizontal portion of said frame, and bent also to provide flanges extending along the sides of the depending and diverging leg portions 16 thereof, as best shown in Figure 4; and the reference numerals 17 designate the supporting and driving wheels of the tractor, four of such wheels being employed two located upon each side of the machine. These wheels are all driven from the engine through the transmission gearing and driving mechanism employed, and they are supported from the lower ends of the depending legs of the end frames upon suitable short shafts or journal bearings 18, as clearly appears in Figure 1. Preferably the lower ends of the legs are tied together by longitudinally extending bars 181, one of which is shown in Figure 1, to thereby provide a more rigid support for the wheels and prevent bending of the end frames when the tractor is in use; it being appreciated that the metal throughout the entire frame structure will be disposed in such a manner as to secure maximum strength with minimum weight as it is highly desirable that the tractor as a whole be kept as light and the frame thereof as flexible as practicable consistent with the service for which the machine is designed.

The features of construction and arrangement above enumerated provide a frame structure wherein the wheels are properly supported relative to one another and to the driving shafts, as will hereinafter appear, by the rigid end frame members, and wherein flexibility of the frame structure is secured by the tranverse frame members arranged comparatively close together so that the frame structure regarded in its entirety is comparatively free to yield, due to unevenness of the ground; while at the same time approximately uniform bearing pressure is secured at all four wheels of the tractor, as will be appreciated.

The driving wheels are preferably driven through pairs of sprocket chains 19 which extend about sprocket wheels 21 secured one to each wheel so as to rotate the same, and which sprocket chains are driven from driving shafts 20 through suitable sprocket pinions 21; this driving arrangement being duplicated upon each side of the tractor, as will be appreciated, as both the wheels upon each side thereof are driven from the engine through the transmission mechanism and the two driving shafts 20. The driving shafts are supported at their outer ends in bearings 22 which in turn are supported in openings in the upper horizontal web portions 23 of the end frames 14, see Figure 4, while the inner ends of said driving shafts are supported in bearings 24 supported in openings in the side walls 25 of the transmission casing.

The transmission casing 8 is hollow in form and the open top thereof is closed by a cover 26, as best shown in Figure 4; and the reference numeral 27 designates two annular friction driven members carried one by the inner end of each driving shaft 20 and which members are fixedly secured to said shafts so as to drive the same, said members being shown as comprising dished end plates 28 secured to sleeve members 29, which in turn are secured to the shaft by means of suitable keys; and which sleeves serve as supports for the inner races of the bearings 24 whereby the inner ends of the shafts 20 are supported. The peripheries of the friction driven members are provided with V-shaped grooves, as best shown in Figure 4, which grooves are preferably provided by building the said members up of a plurality of annular rings having V-shaped inner peripheries whereby friction is increased, and a better driving action between the friction driving members, to be next referred to, and said driven members is secured.

The main driving shaft which is driven from the engine appears most clearly in Figure 3 of the drawing and is designated by the numeral 30, and the same is provided with a bevel pinion 31 at its rear end which meshes with and serves to drive a bevel gear 32, which is fixedly secured upon a shaft 33 the ends of which in turn are supported in brackets 34 within the casing 8; and which bearings extend preferably from the front wall of the casing to about the middle thereof to thereby bring the said shaft 33 into a central position within the casing. The shaft 33 which is driven from the engine through the pinion 31 and gear 32 has a wide driving gear 35 fixedly secured upon it and from which the driving shafts 20 are driven, Supported upon the shaft 33 are two oscillating members both designated by the reference numeral 36 as both are alike and each of which members has two bearings 37, 38 adjacent its lower end, and within which bearings two driving shafts 39, 40 are rotatably supported. The inner ends of these last mentioned shafts are provided with pinions 41, 42 which mesh with one another, as shown in Figure 3. One of these pinions, for example the pinion 42, meshes with the gear 35 so that both the gears 41, 42 carried by each oscillating member 36 are driven from said gear 35. It will be appreciated that the gears 41, 42 and the shafts 39, 40 of each oscillating member are driven in opposite directions so that one of these shafts may be used for forward driving and the other for reverse driving of the tractor, as will hereinafter appear; and that the driving mechanism above referred to is duplicated upon each side of the tractor, as illustrated in Figure 4. Inasmuch as both the gears 42 mesh with the wide gear 35 the driving mechanisms upon each side of the central line of the tractor, and the driving shafts extending to the driving wheels at the two sides thereof, will both be driven from the single wide gear 35 and from the shaft 33.

The outer ends of the shafts 39, 40 are provided with grooved friction driving members 43, 44 so shaped as to correspond with the interiors of the annular friction driven members 27, which driving members may be made up of a plurality of discs having V-shaped peripheries, the same as in the case of the driven members 27. The bearings 37, 38 are comparatively long and the shafts 39, 40 may move axially in said bearings to a slight extent to thereby insure proper seating of the grooved driving members 43, 44 within the grooves of the driven members 27 and prevent binding of the parts in question. Obviously two driving members cooperate with each driven member and as said members are carried by the shafts 39, 40 which rotate in opposite directions, it follows that each driven member may be driven in either a forward or in a reverse direction, according to which particular friction driving member is in engagement with the interior of the driven member in question at any given time.

The oscillating supporting members 36 are independently operated to bring one or the other of the friction driving members 43, 44 which each carries into driving engagement with the interior of the driven member 27 with which each oscillating member is associated by means of arms 45 extending upward therefrom through slots 46 in the transmission gear casing cover. These arms are acted upon by springs 47 so arranged that normally the friction driving members 43 will be yieldably held in engagement with the interiors of the driven members 27 These driving members are the ones whereby forward driving is secured, so that when the springs 47 are permitted to act the driving mechanism will operate to drive the tractor in a forward direction.

The levers 45 may be ordinary forms of levers operable directly by hand although I prefer to operate said levers through suitable lines 48 and links 49 pivotally connected with the upper ends of said levers, so that by pulling upon the lines the levers may be swung rearward, and the friction driving members 44 moved into driving engagement with the interiors of the friction driven members 27, to thereby secure reverse driving of the tractor.

It will also be appreciated that inasmuch as the oscillating members 36 are independent of one another, and are operable each independent of the other through its lever 45, the parts may be so positioned as to secure forward driving of the wheels on one side of the tractor and rearward driving on the other side, thus providing for the turning of the tractor within an extremely short space; and it also follows that the driving of the wheels upon either side of the tractor may be interrupted by holding the levers 45 in a central position with all the driving members 43, 44 out of engagement with the driven members 27 with which they cooperate; and that steering of the tractor may be accomplished by permitting slipping between the friction driving members and the interiors of the driven members. In the normal operation of the tractor, however. the tension of the springs 47 may be readily adjusted so that the machine will proceed in a straight ahead direction; it being necessary to bestow little or no attention, as by pulling upon one or the other of the lines 48, to the steering of the tractar except when a considerable deviation from a straight ahead path of travel is required.

When the tractor is at rest and because of the fact that a considerable portion of the weight of the engine is in front of the vertical plane of the front pair of driving wheels, and downward static pressure upon the forward wheels is materially greater than the downward pressure on the rear wheels of the machine. When the tractor is in operation, however, and is exerting its normal draw bar pull the reactive forces set up by the driving action of the engine tend to lift the front pair of driving wheels from the ground, and to force the rear pair of driving wheels more firmly against the ground; the result being that the downward forces at the points of contact between the four driving wheels and the ground is more uniformly distributed than is the case when the tractor is at rest. The design of the frame structure in my improved tractor and the position of the engine relative to the vertical plane of the forward driving wheels is in the practical embodiment of my invention such that a substantially equal distribution of downward forces is secured when the tractor is in use pulling its normal load, thus securing substantially equal driving effort upon the several driving wheels of the machine.

Having thus described and explained my invention, I claim and desire to secure by Letters Patent:

1. In a tractor of the class described having driving wheels located upon opposite sides thereof, and an engine for driving the tractor; two friction driving members driven from said engine; two driving shafts the outer ends of which are operatively connected with said driving wheels; two friction driven members carried one by the inner end of each shaft aforesaid; two oscillating members whereby said friction driving members are supported; and means for moving said oscillating members each independently of the other to thereby cause said friction driving members to engage said driven members to thereby drive said shafts.

2. In a tractor of the class described, driving mechanism comprising a shaft driven from the engine which drives the tractor; a driving gear carried by said shaft; two oscillating members having each a bearing; two shafts rotatably supported one in each of said bearings, two friction driving members carried one by each of said shafts; two pinions carried by said shafts, and both of which engage the driving gear aforesaid, two driving shafts the outer ends of which are operatively connected with driving wheels upon each side of the tractor, and the inner ends of which support two friction driven members; and means for operating said oscillating members each independently of the other to cause the friction driving members aforesaid to engage the friction driven members carried by said last mentioned two driving shafts.

3. In a tractor of the class described, driving mechanism comprising a shaft driven from the engine whereby the tractor is operated; a gear carried by said shaft; two oscillating members supported by said shaft and having each a bearing; two driving shafts supported one in each of said bearings; two pinions carried by said driving shafts and located adjacent one another, and both of which mesh with the gear aforesaid; two friction driving members carried by said last mentioned shafts; two driving shafts the outer ends of which are operatively connected with driving wheels upon each side of the tractor; two friction driven members annular in form secured one to the inner end of each of said driving shafts, and which members surround the friction driving members aforesaid; and means for operating said oscillating members each independently of the other to cause the friction driving members aforesaid to engage the inner peripheries of the friction driven members aforesaid.

4. In a tractor of the class described, driving mechanism comprising two forward friction driving members and two reverse friction driving members geared together so as to rotate in unison in opposite directions; means for driving said several driving members from the engine of the tractor; two transversely extending driving shafts the outer ends of which are operatively connected with driving wheels upon opposite sides of the tractor; two annular friction driven members carried one by the inner end of each shaft aforesaid, and each of which members surrounds a forward and a reverse driving member; and means for moving said friction driving members to cause a forward or a reverse driving member to operatively engage the friction driven member within which said driving members are located.

5. In a tractor of the class described, driving mechanism comprising two forward friction driving members and two reverse friction driving members geared together so as to rotate in unison in opposite directions; two oscillating members whereby said driving members are supported; a driving gear driven from the engine of the tractor; gearing through which all of said friction driving members are driven from said driving gear; two transversely extending driving shafts the outer ends of which are operatively connected with driving wheels upon opposite sides of the tractor; two annular friction driven members carried one by the inner end of each shaft aforesaid, and each of which members surrounds a forward and a reverse driving member; and means for moving said oscillating members to thereby cause either a forward or a reverse driving member of each pair to engage the inner periphery of the driven member which surrounds them, to thereby accomplish the driving of said driving shafts.

6. In a tractor of the class described, driving mechanism comprising a gear casing; a shaft located within said casing and driven from the engine of the tractor; a gear carried by said shaft; two oscillating members supported by said first mentioned shaft, and each of which carries a shaft; two friction driving members secured to the outer ends of said last mentioned shafts; two pinions carried by the inner ends of said last mentioned shafts, and both of which mesh with the gear aforesaid; two driving shafts the outer ends of which are operatively connected with driving wheels upon each side of the tractor, and the inner ends of which are supported in bearings carried by said gear casing; two friction driven members annular in form and located within said gear casing, and which members are carried by said driving shaft and surround the driving members aforesaid; and means for operating said oscillating members to cause said friction driving members to engage the inner peripheries of said annular friction driven members.

7. In a tractor of the class described, a transversely extending main frame whereby the driving mechanism of the tractor is supported; two side frames formed from a sheet of metal suitably flanged to provide a substantially horizontal portion having inwardly extending flanges, and depending and diverging flanged leg portions, said side frames being secured one to each end of said main frame; driving wheels supported at the lower ends of said flanged leg portions; and means through which said driving mechanism is operatively connected with said driving wheels.

8. In a tractor of the class described having end frames whereby driving wheels upon opposite sides of the tractor are supported, two friction driving members driven from the engine of the tractor, and each of which is provided with a plurality of circumferentially extending V-shaped grooves; two transversely extending driving shafts the outer ends of which are operatively connected with the driving wheels of said tractor; two annular friction driven members each having a plurality of internal circumferentially extending ridges corresponding in form with the grooves aforesaid, and which members are secured one to the inner end of each driving shaft and surround the driving member with which it cooperates; and means for moving said driving members into and out of engagement with said driven members.

9. In a tractor of the class described, a transversely extending comparatively narrow main frame; two end frames secured one to each end of said main frame, and each of which includes a horizontal top portion, and two depending and diverging legs, one at each end of said top portion; four bearing spindles one at the lower end of each of said legs, and the axes of which spindles are spaced further apart than the length of said frame in the direction of travel of the tractor; four wheels carried one by each of the spindles aforesaid; a gear casing supported from said main frame and located at the middle portion thereof; transmission gearing arranged within said gear casing; driving mechanism including two driving shafts extending to said side frames and supported in bearings carried by the horizontal portions thereof, and the outer ends of which driving shafts are operatively connected with said wheels so as to drive all of them; and an engine supported in front of said main frame and operatively connected with said transmission gearing to drive the tractor.

In testimony whereof I affix my signature.

LLOYD BLACKMORE.